(12) United States Patent
Haase et al.

(10) Patent No.: US 9,542,241 B2
(45) Date of Patent: Jan. 10, 2017

(54) NAVIGATION APPLICATION INTERFACE

(75) Inventors: Robert Haase, White Lake, MI (US); Rainer Oder, VS-Schwenningen (DE); Steven Montealegre, Farmington Hills, MI (US); Rhita Boufelliga, Farmington Hills, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 50 days.

(21) Appl. No.: 13/181,379

(22) Filed: Jul. 12, 2011

(65) Prior Publication Data

US 2013/0019252 A1    Jan. 17, 2013

(51) Int. Cl.
G06F 9/46     (2006.01)
G06F 9/54     (2006.01)
G06F 9/445    (2006.01)
G01C 21/26    (2006.01)

(52) U.S. Cl.
CPC .............. *G06F 9/54* (2013.01); *G06F 9/445* (2013.01); *G01C 21/26* (2013.01)

(58) Field of Classification Search
None
See application file for complete search history.

(56) References Cited

U.S. PATENT DOCUMENTS

| | | | |
|---|---|---|---|
| 6,256,578 B1* | 7/2001 | Ito | 701/400 |
| 6,385,541 B1* | 5/2002 | Blumberg et al. | 701/484 |
| 6,389,333 B1* | 5/2002 | Hansman et al. | 701/3 |
| 6,442,475 B1 | 8/2002 | Utsui et al. | 701/200 |
| 7,610,148 B1 | 10/2009 | Walters et al. | 701/208 |
| 2001/0002454 A1* | 5/2001 | Narumi et al. | 701/200 |
| 2002/0152093 A1* | 10/2002 | Chalmers et al. | 705/1 |
| 2004/0054460 A1 | 3/2004 | Walters et al. | |
| 2005/0165859 A1 | 7/2005 | Geyer et al. | 707/201 |

(Continued)

FOREIGN PATENT DOCUMENTS

EP    0838771 A2    4/1998
EP    1111338 A2    6/2001

(Continued)

OTHER PUBLICATIONS

European Search Report, dated Oct. 22, 2012, pp. 1-8, European Patent Application No. 12176083.9, European Patent Office, Netherlands.

(Continued)

Primary Examiner — Umut Onat
(74) Attorney, Agent, or Firm — Artegis Law Group, LLP

(57) ABSTRACT

A navigation system is provided with an application programming interface to enable efficient integration of a navigation solution into a navigation platform. The system includes a client-server architecture and the API is implemented with a standardized set of request and response functions defined in the client and server, respectively. The API includes a rapid prototyping interface component for enabling development of a navigation solution independent of a particular navigation platform. An information discovery and exchange interface component enables the navigation platform (client) to discover and retrieve the information available from the navigation solution (server) navigation solution.

20 Claims, 11 Drawing Sheets

(56) References Cited

U.S. PATENT DOCUMENTS

| | | | |
|---|---|---|---|
| 2006/0136552 A1* | 6/2006 | Krane | G06F 9/54 709/203 |
| 2006/0253417 A1 | 11/2006 | Brownrigg et al. | 707/1 |
| 2007/0050129 A1* | 3/2007 | Salmre | 701/207 |
| 2007/0112780 A1 | 5/2007 | Stone et al. | 707/10 |
| 2007/0130153 A1 | 6/2007 | Nachman et al. | 707/10 |
| 2008/0018527 A1 | 1/2008 | LaMance et al. | 352/357.1 |
| 2010/0057343 A1 | 3/2010 | Chan et al. | 701/201 |
| 2010/0169003 A1* | 7/2010 | Van Der Meer | 701/207 |
| 2011/0071881 A1* | 3/2011 | Zheng et al. | 705/10 |

FOREIGN PATENT DOCUMENTS

| | | | |
|---|---|---|---|
| GB | 2 445 839 A | 7/2008 | G06F 9/44 |
| JP | 10-253367 B1 | 9/1998 | |
| JP | 2001229494 A2 | 8/2001 | |
| JP | 2006247343 A | 9/2006 | |
| JP | 2006350469 A | 12/2006 | |

OTHER PUBLICATIONS

U.S. Office Action dated Aug. 31, 2012, U.S. Appl. No. 12/749,298, U.S. Patent and Trademark Office, 9 pgs.

* cited by examiner

NAVIGATION APPLICATION INTERFACE

FIELD OF THE INVENTION

This application relates to the field of navigation systems, including vehicle navigation systems. More specifically, the application relates to navigation systems that include an application programming interface (API).

BACKGROUND OF THE INVENTION

Navigation systems may be onboard vehicle systems or portable devices, such as designated handheld units or mobile phones executing navigation applications. Often, in the case of a vehicle navigation system, the system is part of a larger infotainment system, which provides entertainment and information services to the vehicle user. Navigation systems typically include a navigation platform and an underlying navigation core application, also termed a navigation solution. The navigation platform typically includes hardware architecture and a software framework, including an operating system, and related user-interfaces to support execution of, and user interaction with, the navigation solution. The navigation solution is typically the "back end" software and related databases that provide core navigation functionality, such as, route planning and guidance, and map, address and point of interest (POI) information.

Navigation systems, especially vehicle navigation systems, have developed into complex and tailored systems that have historically been developed by original equipment manufacturers (OEM's) as embedded information systems in which the navigation platform and navigation solution are both developed and built together as a unitary system. A more recent trend has been for OEM's to take advantage of external navigation solution expertise and look to outside vendors for navigation solutions. In a typical development cycle, a navigation or infotainment system OEM may design a new navigation platform based on requirements defined by a customer, such as a vehicle manufacturer. The navigation system OEM will, in turn, require a tailored navigation solution that is able meet specific requirements for integration into the navigation platform. The step of integrating the navigation solution is often complex and involved, since the navigation platform is configured to interface with the navigation solution in a specific and complex way. Accordingly, a particular provider-developed navigation solution will be specifically tailored for a particular OEM navigation platform and will require the platform to interface with the solution in a very specific and often complex way. A navigation system OEM who has relied upon a particular provider for a navigation solution may be somewhat committed to that provider for procurement of future solutions. The economics of navigation system development are thus characterized by added costs and inefficiencies, which could be reduced if more flexibility were provided for integrating navigation solutions into navigation platforms.

Another problem relates to different respective development cycles of navigation platforms and navigation solutions. Navigation platform development may cycle with yearly or vehicle model cycles while navigation solution development cycles are not so limited and are typically more rapid. New technologies may enable frequent upgrades to features and functionality in a navigation solution. On the other hand, integrating such features and functionality into the navigation system might have to wait until the next generation navigation platform is developed. As an example, consider a navigation solution that has been upgraded with appropriate database information to provide a new lane recommendation feature, which suggests the best traffic lane to a user. In the current technological and economic environment, adding such a feature to an OEM navigation system would usually require significant modification to or even complete re-design of the navigation platform in order to access the new feature. It would therefore be advantageous to provide a way for a navigation platform to discover and integrate new functionality available in a navigation solution.

Yet another problem is that the performance and compatibility of a navigation solution usually cannot be fully assessed until the navigation solution is integrated into a host navigation platform. Similarly, navigation system OEM's have difficulty testing compatibility of the navigation solution with the platform until both the platform and the solution are finalized. As such, it would be desirable to enable the prototyping of navigation solutions to proceed without dependency on the development of a host navigation platform.

Thus, there is a need in the art for improvements that address the aforementioned problems and facilitate more efficient and flexible integration of navigation solutions into navigation platforms. The aforementioned shortcomings and others are addressed by navigation systems and related methods according to aspects of the invention.

SUMMARY OF THE INVENTION

The invention provides navigation systems that utilize a standardized application programming interface (API). The API provides for the abstraction of the underlying complexity of a navigation solution. Thus, complex navigation functions within the solution may be accessed by a navigation platform using relatively simple requests. Moreover, both navigation platforms and navigation solutions may be developed to interface through the predefined API, thus enabling greater flexibility and efficiency in development and integration.

The API includes interface components for rapid prototyping, initialization, view settings, information discovery and exchange, vehicle position, route guidance, navigation audio, and traffic message channel (TMC) components. These interface components are defined by a standard set of functions to accomplish high-level interaction between the navigation platform and navigation solution.

The rapid prototyping interface component may include a set of API functions which are minimally necessary to ensure efficient integration of a navigation solution and navigation platform. The host navigation platform and the navigation solution may be configured to interface according to the rapid prototyping interface component and compatibility is thereby ensured. The navigation solution may thus be developed and prototyped without requiring full integration into an existing navigation platform. The initialization interface component provides standard initialization sequence for the navigation solution and platform.

The information discovery and exchange interface component enables the navigation platform to discover and utilize all information and functionality offered by the navigation solution. Thus, the disclosed functionality provided in a navigation solution may be discovered and utilized without requiring modification of the navigation platform.

According to an example of an implementation of the invention, the API may be implemented in a client-server architecture. The navigation platform may include navigation client components configured to interface, via the API, with a navigation server component provided by the navigation solution. The navigation client component may issue request commands to the navigation server component. Similarly, the navigation server component issues response commands or messages to the client component. The request and response messages may be implemented as high-level function calls and defined in an object-oriented programming language, such as C++.

Other devices, apparatus, systems, methods, features and advantages of the invention will be or will become apparent to one with skill in the art upon examination of the following figures and detailed description. All such additional systems, methods, features and advantages within this description are intended to be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

It will be understood, and appreciated by persons skilled in the art, that one or more processes, sub-processes, or process steps described in connection with the figures included in this application may be performed by hardware and/or software. If the process is performed by software, the software may reside in software memory in a suitable electronic processing component or system such as, one or more of the functional components or modules schematically depicted in the figures. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain or store the program for use by or in connection with an instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is permanently fixed, as the program may be electronically captured, via for instance optical scanning of the paper, reading of punch cards or other medium, then compiled, interpreted or otherwise processed in a suitable manner if necessary, and then stored in a computer memory. A processor as disclosed herein may include a microprocessor, central processing unit (CPU), digital signal processor or other digital or analog components which constitute a machine for executing instructions stored in a computer-readable medium.

Figure 1:
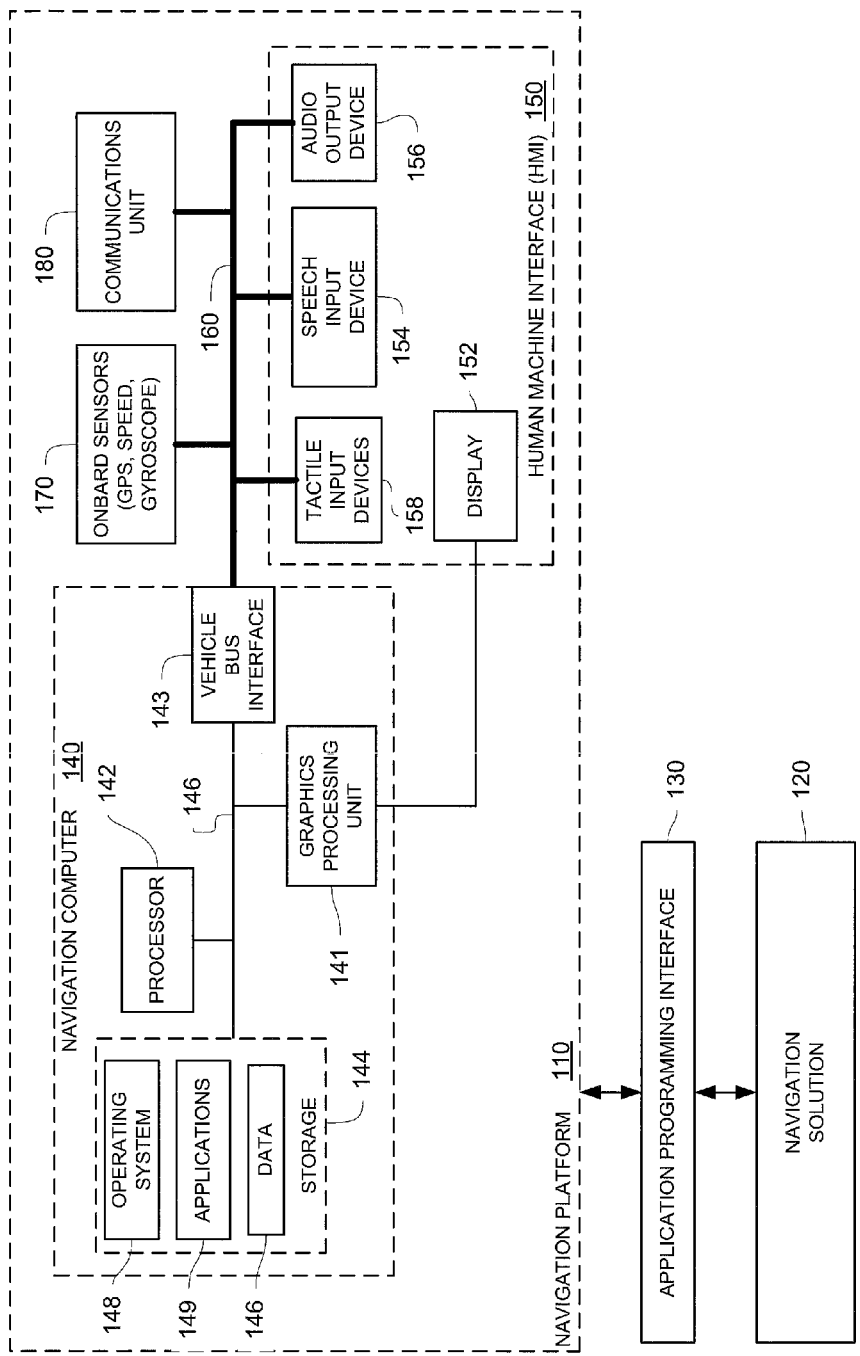
FIG. 1 is a block diagram of a navigation system, according to an example of one implementation of the invention.

FIG. 1 is a block diagram of a navigation system according to an example of one implementation of the invention. The navigation system includes a navigation platform 110 and a navigation solution 120 that cooperate through an application programming interface 130, as will be described in detail below. The navigation platform 110 includes a navigation computer 140, a human-machine interface (HMI) 150, onboard sensors 170 and a communications unit 180.

Navigation computer 140 generally includes a processor 142 and storage 144, which are in electronic communication via bus 146. Storage 144 is an electronic memory component that provides for the storage of information and that may include data and instructions for processor 142 and a fixed storage (internal hard disk or integrated solid-state memory) as well as removable storage components (flash disks, removable memory cards, etc). As will be recognized, storage element 144 represents both local storage as well as remote storage (for example, cloud-based storage components accessible remotely via a network connection). Storage 144 provides for the storage of data 146 and instructions for processor 142. The instructions may provide an operating system 148 and one or more applications 149 executing within the operating system 148 via processor 142 for performing designated tasks. Bus 146 may also communicate with a graphic processing unit 141, which includes designated graphics processing components and provides a signal to a display 152. The navigation computer 140 may communicate with a vehicle sub-system through a vehicle bus interface 143.

HMI 150 enables user interaction with the navigation platform 110 and may include display 152, a speech input device 154, audio output device 156 and tactile input devices 158, that may include a keyboard, touch screen, dashboard or console control or other devices which permit the user to interact with the navigation platform 110 in a tactile manner.

An onboard vehicle bus 160, which may include a bus complying with the Controller Area Network (CAN) bus standard, enables electronic communication between components of the vehicle sub-system and navigation computer 144. The onboard sensors 170 may include sensors for GPS, speed, gyroscopic and other parameters. The communication unit 180 may include a wireless wide-area network (WAN) or other connection.

As will be recognized by those of ordinary skill, navigation solution 120 and API 130, although illustrated in a particular relationship with navigation platform 110, may cooperate with navigation platform 110 in different ways. For example, navigation solution 120 and API 130 may be implemented as applications stored locally in storage 144. Alternatively, navigation solution 120 may be provided as a remote service accessible via wireless link via communications unit 180 under a cloud computing and/or software-as-a-service model.

Figure 2:
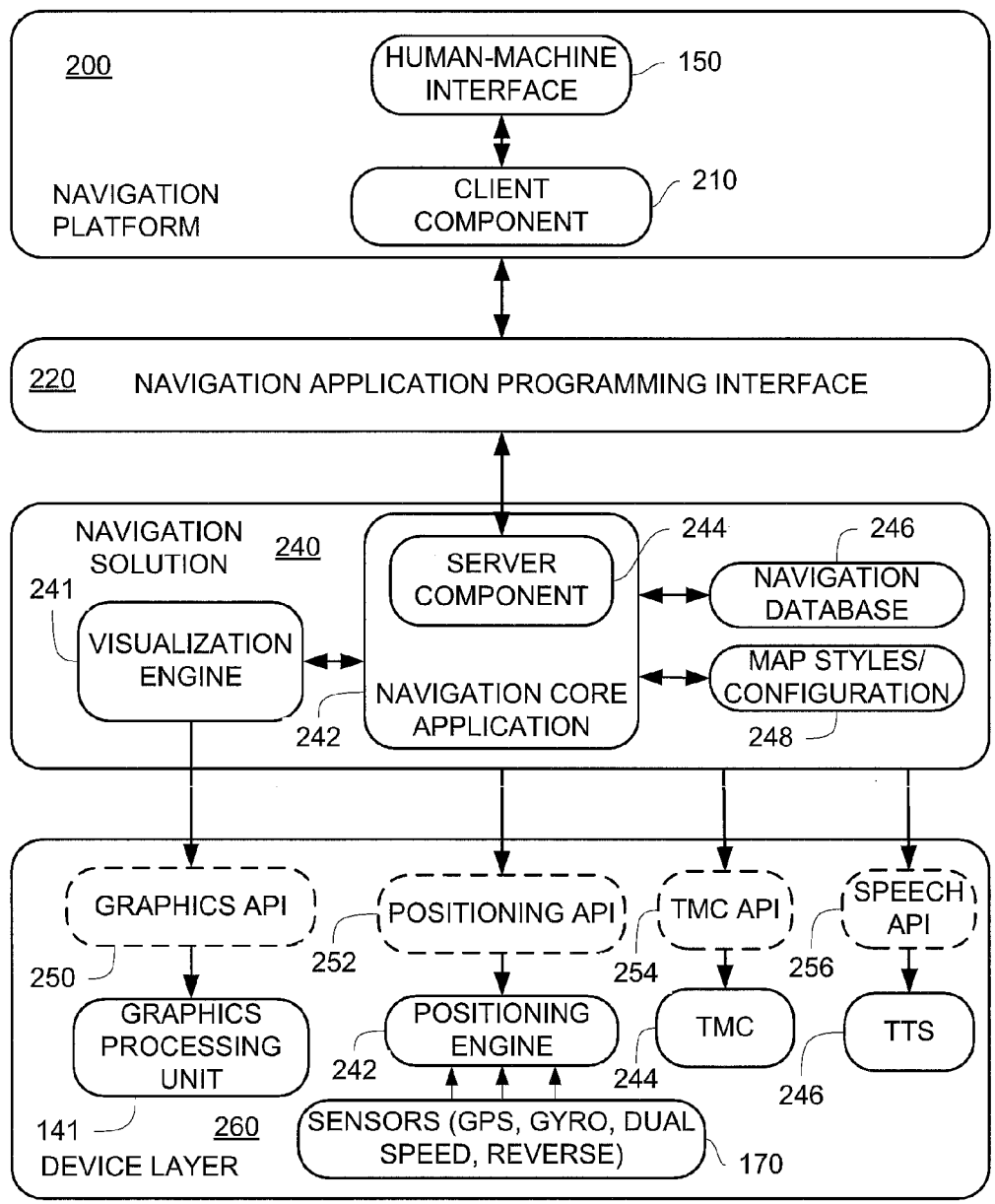
FIG. 2 is a block diagram of a navigation system architecture applicable to the navigation system of FIG. 1 including an API according to an example of an implementation of the invention.

FIG. 2 is a block diagram illustrating the architectural configuration of a navigation system. The system architecture includes a navigation platform layer 200, API layer 220, navigation solution layer 240 and device layer 260. The navigation platform layer 200 includes the HMI 150 described above with regard to FIG. 1, as well as a client component 210 that cooperates with API layer 220 and through which HMI 150 will access the navigation solution layer 240. As will be recognized, client component 210 may be integrated into the HMI 150 or configured as a separate component, as illustrated in FIG. 2. The client component 210 provides the functionality to interface, via API layer 220, with the navigation solution layer 240, as will be explained in more detail below.

Navigation solution layer 240 includes a core navigation application 242 that provides a server component 244 and cooperates with a navigation database 246 and a map styles/configuration database 248. Navigation database 246 includes information relating to navigation routes, roads, points of interest and other travel related information. Map styles/configuration database 248 includes information relating to map styles and presentation/display preferences relating to graphical map displays which are typically displayed as a layer combined with route guidance graphics (i.e., road illustrations). Navigation core application 242 also interacts with a visualization engine 241, which provides the output necessary to enable a user to visualize the output of core navigation application 242 in graphic form. Server component 244 cooperates with API layer 220 as will be explained in more detail below.

Device layer 260 includes a number of devices and corresponding interfaces, which cooperate with navigation solution layer 240. These include a graphics processing unit 141, positioning engine 242, TMC device 244 and a text to speech (TTS) device 246. Respective interfaces are provided for permitting these devices to cooperate with navigation solution layer 240, including a graphics API 250, positioning API 252, traffic media center API 254, and speech API 256. Positioning engine 244 obtains vehicle sensor information from sensors 170. As will be recognized, the device layer 260, even though it may have elements, such as sensors and HMI elements, in common with navigation platform 110 illustrated in FIG. 1, is illustrated in FIG. 2 as a separate layer for conceptual purposes.

Those of ordinary skill will understand that one or several servers may be provided in association with server component 244. For example, one server may provide functionality for basic route guidance capabilities of navigation core application 242 while another may provide functionality for a three-dimensional city viewer or globe zoom capability of the navigation core application 242.

Figure 3:
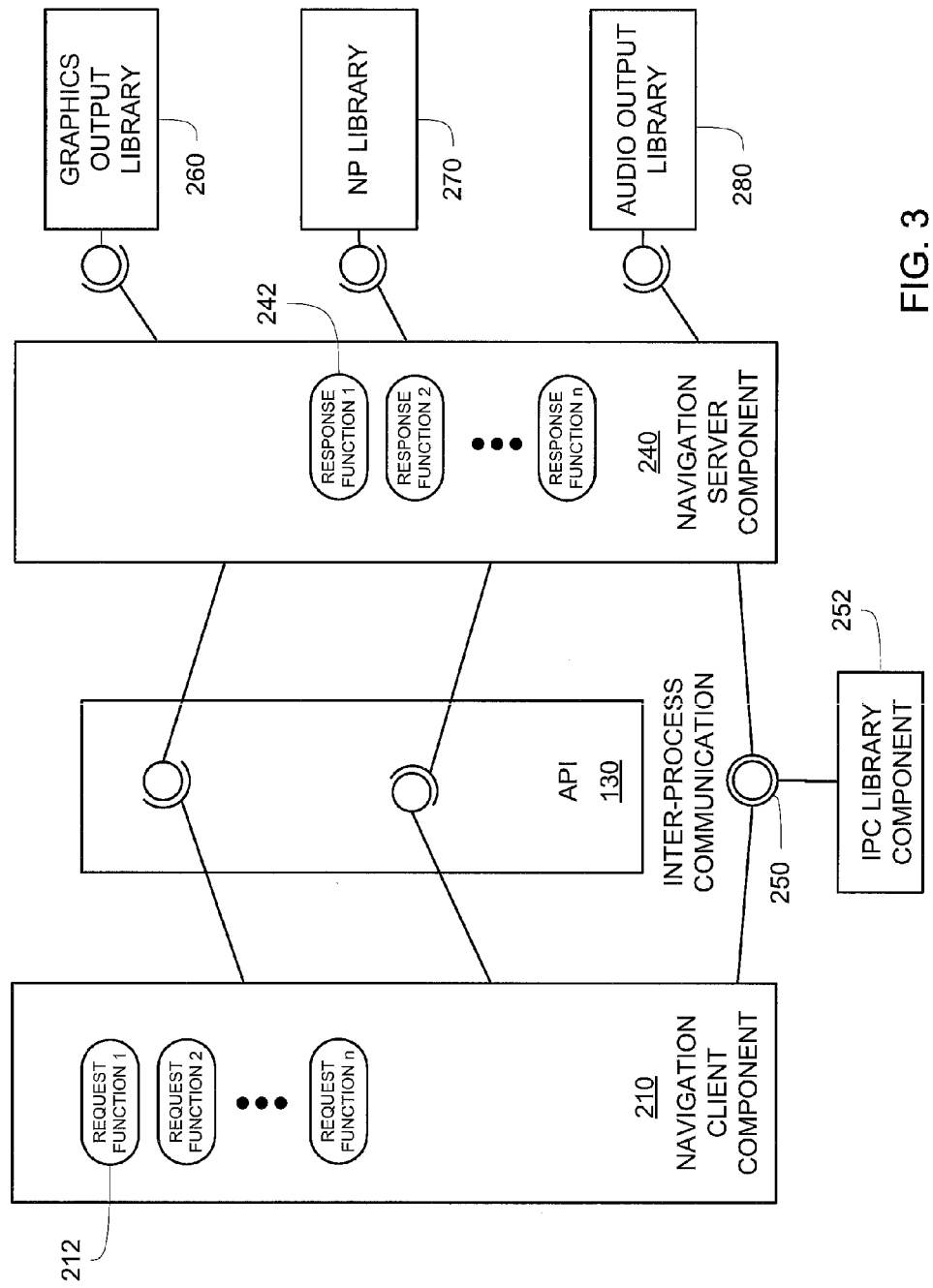
FIG. 3 is a block diagram illustrating components and interfaces of the navigation system of FIG. 1 according to an example of one implementation of the invention.

FIG. 3 is a block diagram illustrating more details with regard to the client-server architecture in a navigation system according to an aspect of the invention. Navigation application programming interface 130 facilitates interaction between client component 210 and navigation server component 240. In accordance with an aspect of the invention, client component 210 provides a number of request functions 212 in order to initiate requests to server component 240. Server component 240 provides a number of response functions 242 to generate responses to client component 210. An inter-process communication (IPC) channel 250 provides for inter-process exchange of data, including messages, among processes performed by the client component 210 and the server component 240. As will be apparent to those of ordinary skill, the IPC channel may be implemented by known methods, such as message passing, synchronization, shared memory, and remote procedure calls (RPC). Moreover, the method used to implement the IPC channel may vary based on the bandwidth and latency of communication between the threads, and the type of data being communicated. The IPC channel may utilize an IPC library component 252 for message processing. Server component also includes interfaces to system level resources, which may include a graphics output library 260, navigation positioning (NP) library 270 and audio output library 280.

The following is a list of example functions that are suitable for implementing navigation API according to aspects of the invention. The list is not intended to be exhaustive or self-limiting in any fashion. Additionally, the nomenclature utilized for the functions described is arbitrary and not intended to be limiting in any fashion. Functionality for each term is also included, but the manner in which that functionality is accomplished is not limited in any manner in the implementations described in this application.

Those of ordinary skill in the art will recognize that these functions may be implemented in a suitable programming language, an object-oriented programming language such as C++. Moreover, it will be apparent to those of ordinary skill that the nomenclature incorporating a "request" term in a function name designates function calls implemented on the navigation client component. Similarly, function names incorporating a "response" term designate function calls implemented on the navigation server component. Suitable functions for implementing the aforementioned interface components will be described below. Parentheticals are used to represent example values or parameters passed by the functions.

As will be recognized, the example response functions provided by the server component of the navigation solution provide an abstraction layer of complex functionality within the navigation solution. As such, the navigation platform may access the full functionality within the navigation solution by request functions that are formulated as relatively simple commands and without necessitating complex processes associated with the underlying complexity of the navigation solution.

Figure 4:
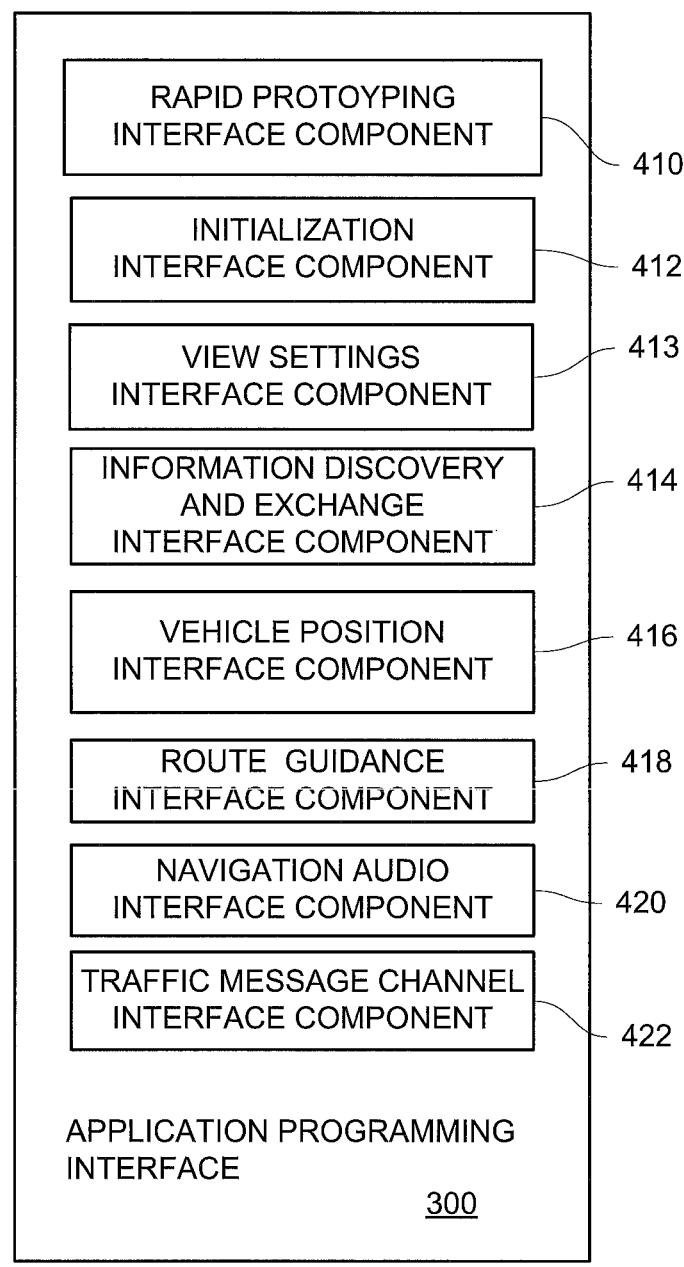
FIG. 4 is a block diagram showing interface components of an API according to an example of an implementation of the invention.

In accordance with an aspect of the invention, as illustrated in FIG. 4, an example API according to the invention includes a number of functional interface components that are implemented by subsets of functions of the overall API 300. These interface components include a rapid prototyping interface component 410, initialization interface component 412, view settings interface component 413, information exchange interface component 414, vehicle position information interface component 416, route guidance interface component 418, navigation audio interface component 420 and traffic media message channel (TMC) interface component 422. Each will be explained in further detail below.

Rapid Prototyping Interface Component

In accordance with an aspect of the invention, a rapid prototyping interface component is implemented to enable rapid prototyping of navigation solutions. The rapid prototyping interface component provides a minimal set of functions necessary to enable functional evaluation and testing of a navigation solution independent of the existence of a host navigation platform. The rapid prototyping interface component facilitates initialization, scrolling, rotation and route guidance functions. These functions enable developers of navigation solutions to evaluate their solutions without the need for prior integration into an existing OEM navigation platform. This enables integration of any solution with a minimum amount of effort for resources and development time to evaluate the solution in a real life environment. Functions defining an example rapid prototyping interface component are detailed in the description that follows and the figures referenced in this application.

requestInit (VID)—Function requestInit is called by the navigation client component 210 to initialize the navigation server component 240 after the navigation client component 210 has been started in the system. The function call may pass a visual component ID (VID) to the navigation server component as an identifier for the underlying graphical subsystem of the device layer. The navigation server component initializes itself successfully and perform the needed steps, e.g. communication to the system interfaces or internal data initialization and without interaction from the navigation client component, before issuing a responseInit message.

responseInit (errorCode)—The function call responseInit provides an answer to the client after requestInit is called, the server uses responseInit to respond, passing an error code unequal to zero, if anything prevented the navigation server component from being initialized correctly. The errorCode parameter represents an error code predefined and published on the server and client side. The error codes are navigation solution supplier specific. An error code equal to zero indicates error free initialization.

requestSetScreenViewport (xTopLeft, yTopLeft, xBottomRight, yBottomRight)—This function call positions the visual output of the navigation solution on the screen and may be called to define the position by specifying the upper left and lower right corner of the visible rectangle for the navigation's visual component. The screen may be measured from the top left corner at (0,0). All absolute screen coordinates start from the (0,0) corner. Thus, the function call may pass four coordinates, xTopLeft, yTopLeft, xBottomRight and yBottomRight, as parameters.

requestSetMeasurementSystem (unitSystem)—This function call will set the current measurement system for the navigation solution for visual and non-visual operations. It may be called during initialization as well as during runtime. The measurement system designation is essential for the correct distance related information to be passed from the navigation client component 210 to the navigation server component 238 and back. The unitSystem may be defined as a enumeration data type having possible values of: undefined, imperial yards, imperial feet, or metric.

requestSetCoordinateSystem (eCoordinateSystem, CoordinateSystem)—The current coordinate system for the navigation solution is set by the requestSet-CoordinateSystem function, which may be called during initialization as well as during runtime. The coordinate system designation is essential for correct position related information passed from the client side to the server and back. The eCoordinateSystem parameter may be defined as an enumeration data type having values representing available coordinate systems.

requestSetZoomScale (double, zoomscale)—This function is used to zoom the visual output in or out, taking into account the current unit measurement system. The parameter zoomScale represents The scale for visual output in meters per display centimeters where the ego position (car) is located. This applies also to perspective views. E.g. passing a value of 500 leads to 500 meters in world coordinates per centimeter on the display. The relation is correct on a horizontal line through the current ego position (car).

requestSetRotation (degree, threshold)—This function requests rotation of the visual output from the server. The degree parameter represents rotation amount for the visible output in degrees. 0 represents north, valid values range from 0° to 359° and −1° to −359°. Negative angles lead to a counter clockwise rotation, positive angles lead to a clockwise rotation. The threshold parameter indicates a rotation level after which rotation an intermediate frame has to be drawn. A parameter value of −1 defines no intermediate frames, but an immediate rotation to the specified angle. If the threshold is greater than the degree value, the threshold is to be ignored and no intermediate frames are to be drawn.

requestSetPosition (xCoordinate, yCoordinate, coordinateType)—This function positions the visual output at a passed world or display coordinate (indicated by coordinateType) taking into account the current coordinate system. The current user position may be defined as the "ego" position and be associated with two different coordinate sets—one coordinate set being an absolute coordinate measured from the screen's zero point, and one coordinate set being a relative coordinate set measured from the zero point of the viewport.

requestSetOrientation (eOrientation, orientation)—Sets the orientation for the visual output according to the passed orientation parameter. The parameter may be an enumeration data type having possible values of northUp (identifying a north up orientation), headingUp (identify a heading up orientation) or destinationUp (identifying a destination up orientation).

requestScrolling (mode, direction, speed)—This function will scroll the visual navigation output, stop the output from scrolling and jump back to the current ego position. The function may be provided with different combinations of parameters. The mode parameter may be an enumeration data type having possible values of start (identifying the start of scrolling), stop (identifying scrolling stop), jumpBackToCarPosition (identifies stop of scrolling plus a jump back to the car position) or detachFromCarPosition (scrolling is detached from the car position). The parameter specifies the mode used for this scroll request. Multiple requests using start changes the scrolling only if parameters have changed, otherwise the call is ignored. Subsequent calls using other modes are to be ignored except for the first call. stop stops scrolling at the current position, where jumpBackToCarPosition stops scrolling and makes the position jump back to the car position. After stop is called, a call to start starts scrolling at the current position, a call to jumpBackToCarPosition makes the position jump back to the car position.

The direction parameter represents the requested scroll direction in degrees (0 representing north, valid values range from 0 to 359 degrees). The speed parameter represents the amount of pixels scrolled per scroll step.

requestSetVisible (visibleState)—This function controls the visibility or invisibility of the navigation's visual output. The visibleState parameter is a binary indicator indicating whether visibility is switched on or off.

requestSetAppearanceStyle (appearanceStyle)—The style of the navigation's visual output is controlled by calling requestSetAppearanceStyle, e.g. day or night time mode. The colors of the style set are typically specific to a navigation platform provider. The parameter appearanceStyle indicates the value to be displayed on the visual output and may be an enumerated data type with values of: day (day colors); night (night colors) or autoStyle (identifies automatic settings). The enumeration may be treated as a bitmask to support traffic highlighting for day and night. If both day and night are set, only the day set is to be displayed.

requestTranslateDestinationToCoordinate—Location input is based on EIS (encoded information string) types. After retrieving the destination string from a speller or from stored destinations, the en-coded string needs to be translated into a coordinate to be used as a stopover or destination by calling requestTranslateDestinationToCoordinate.

responseTranslateDestinationToCoordinate—After a EIS is passed to the navigation server to be translated into a coordinate, the server responds to that request by calling responseTranslateDestinationTo-Coordinate passing the coordinate itself, a status if the EIS could be translated successfully and the passed EIS itself to match the response to the corresponding request.

requestSetDestination (xCoordinate, yCoordinate)—A destination or multiple destination as stopovers may be set using requestSetDestination.

requestStartRoute ( )—This function is called after at least one destination has been set. The requested mode for route guidance is passed as parameter and route guidance starts immediately. The parameter is to be treated as a 32-bit bitmask to support combined route. If no destination has been set by requestSetDestination this call is to be ignored. The set destination is only valid for the first request to start the route. Every new request needs to have a corresponding destination set prior to starting the route.

requestStopRoute ( )—This function stops route guidance. If route guidance is active, the routing may be stopped by calling requestStopRoute. The call is to be ignored, if route guidance is not active.

requestSetDemoMode (demoState, xCoordinateCar, yCoordinateCar)—This function enables or disables the navigation demo mode. In demo mode a route guidance may be started without a GPS device. The navigation device will travel the route by itself. The xCoordinateCar and yCoordinateCar parameters represent the coordinates of the demo car position. If the demoState parameter indicates that the demo mode is to be switched off, the passed demo car position values are to be ignored.

informDemoModeEnabled—This function provides demo mode state to the navigation client. The server sends the signal once after initialization and on change.

The above functions define an example rapid prototyping interface component in accordance with an aspect of the invention. In addition to the rapid prototyping interface functions described above, and again referring to FIG. 4, the pre-defined API functions according to an aspect of the invention may include functions for initialization, view settings (visual output configuration), information discovery and exchange, vehicle position, route guidance, navigation audio, and TMC. These will be described below.

Initialization Interface Component

The requestInit and responseInit functions described above would also belong to the Initialization function set, but are already covered in the rapid prototyping interface component function list.

requestShutdown—This is a function call from the client component to request shutdown the navigation server component.

responseShutdown—This function will to shut down the server component in response respond to the shutdown request.

View Settings Interface Component requestSetViewType (viewType)—This function sets the view type of a map. The parameter viewType is an enumeration with possible values of view2D (2D view); view3D (3D view); viewBird (perspective view without height information); viewGarage(3D perspective view that only displays the vehicle models in a preview garage); and viewPreview (identifies a route preview map).

requestSetComponentContext—This function causes a visual component to listen to subsequent calls. All subsequent are calls are only relevant to support multiple maps for a single navigation client. This call may be exclusive, making all other visual components of a client ignore calls until their context is activated by this request. This call supports different maps to be called after their context has been activated. Different outputs may be supported by different clients.

requestSetScreenViewportFrame—This function will set a screen viewport frame for subsequent operations. The screen viewport frame does not affect the screen viewport's resolution. The frame is set to support a limited screen area for overviews such as route overview or zooming to a traffic incident requestSetVisualAssistance—This function enables and disables visual assistance for visually impaired users.

requestBlock—This function blocks further updates to the visual output. Any subsequent requests will only set states on the server side without causing any rendering or drawing on the screen. State setting request may be stored and later to be applied for drawing as soon as the server is unblocked by the function request Unblock below. The blocking only applies to the sending client's visual output and has no effect on other clients.

request Unblock—This function will unblock update to the visual output blocked by the requestBlock function above. Subsequent requests for drawing from the client will lead to immediate drawing. The unblock function only applies to the calling client's visual output, having no effect on other clients.

responseUnblock—This function responds to the client after the visual output has been unblocked and the complete resulting frame has been drawn. As described above with respect to the requestBlock function, all stored state setting requests from the client will be applied to the resulting frame. Following application of all stored state setting requests, the response will be sent to the client.

requestSetEgoPosition—This function will set the ego position in relative screen coordinates on the screen within the screen viewport of the visual navigation component. The ego position might be indicated by a suitable icon, such as an overhead image of a car, to indicate the current position on the screen. The position is a relative screen coordinate.

requestGetEgoPosition—This function will get the current ego position in relative screen coordinates on the screen within the screen viewport of the visual navigation component.

responseGetEgoPositionOnScreen—This function returns the current ego position in relative screen coordinates on the screen within the screen viewport of the visual navigation component.

Figure 5:
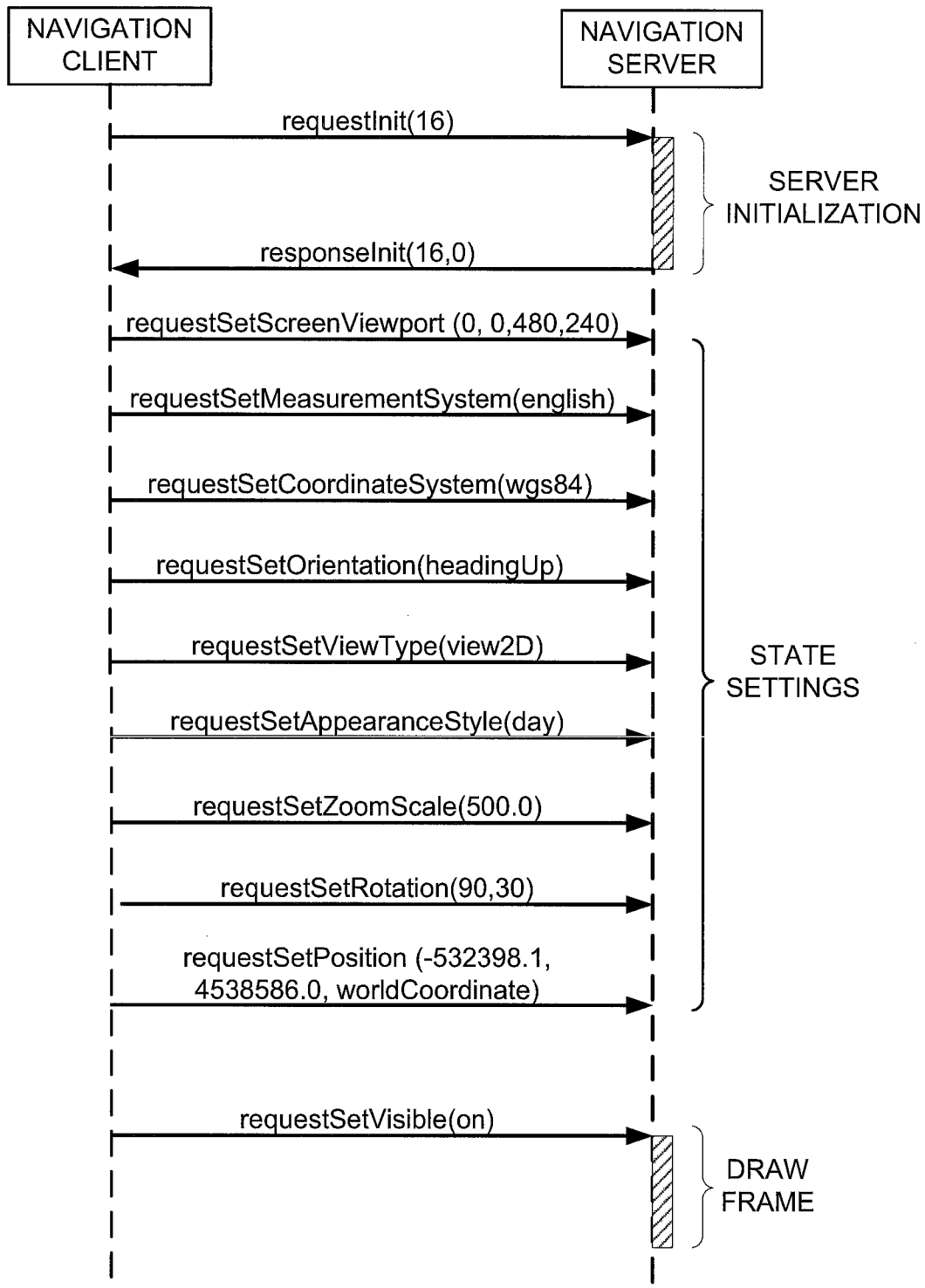
FIG. 5 is a sequence diagram illustrating one example of a request-response dialog for an initialization interface.

The initialization and view settings functions described above and their interaction in the client-server architecture of an example navigation system are further explained with regard to the sequence diagram illustrated in FIG. 5. The sequence begins with the client component submitting a requestInit function to the server. The requestInit function passes a parameter representing a visual component ID, in this case (16), to the server. The server then begins an initialization process, which will include initialization of the navigation solution. Server initialization takes place independent of the client and thus the server component will need to establish communication with all system components, such as system graphic libraries and sensors. When completed, the server component responds via the responseInit command, including an error flag to indicate whether or not initialization was successful.

After the server responds to the initialization request, the client issues a number of state setting messages to the server using the functions described above. These messages will set start up values, e.g. viewport for visual output or requested zoom level. The start-up values may be set, whenever needed, but is typically set before the navigation server is requested to perform further action. Until now, the server is not requested to render or show any visual output. After all state setting requests are made from the server, a requestSetVisible command is issued from the client to instruct the server to render a drawn frame on the graphic output device on the navigation platform.

Information Discovery and Exchange Interface Component

In accordance with one aspect of the invention, an information exchange interface component is provided to enable the navigation platform to discover the types of information, and therefore, capabilities and functionality, available on the navigation solution and to exchange information with the navigation solution. The information exchange interface component may be implemented as a set of request and response functions, as will be further detailed below.

The example system may utilize encoded information strings (EIS) to enable the identification of information available in the navigation solution and retrieved by the navigation platform. The EIS' include information identified by tokens or tags of the form < >. For example, the token <IFT> designates an information type identifier, <CTR> identifies country information, <ITR> designates information identifying an intersection (by the cross or second street). Further example EIS' will be used in some of the function descriptions below.

The information discovery and exchange interface component 414 is further explained with reference to FIG. 6, which illustrates an example information tree for organizing information types, associated EIS tags (denote by "< >") and information values made available by the navigation solution. In addition, FIGS. 7, 8, 9A and 9B, are sequence diagrams, utilizing the information described in the example information tree in FIG. 6, and illustrating sequences for the navigation platform (client) to discover types of information available from the navigation solution (server) and retrieving, as examples, selected country and state location data.

Figure 6:
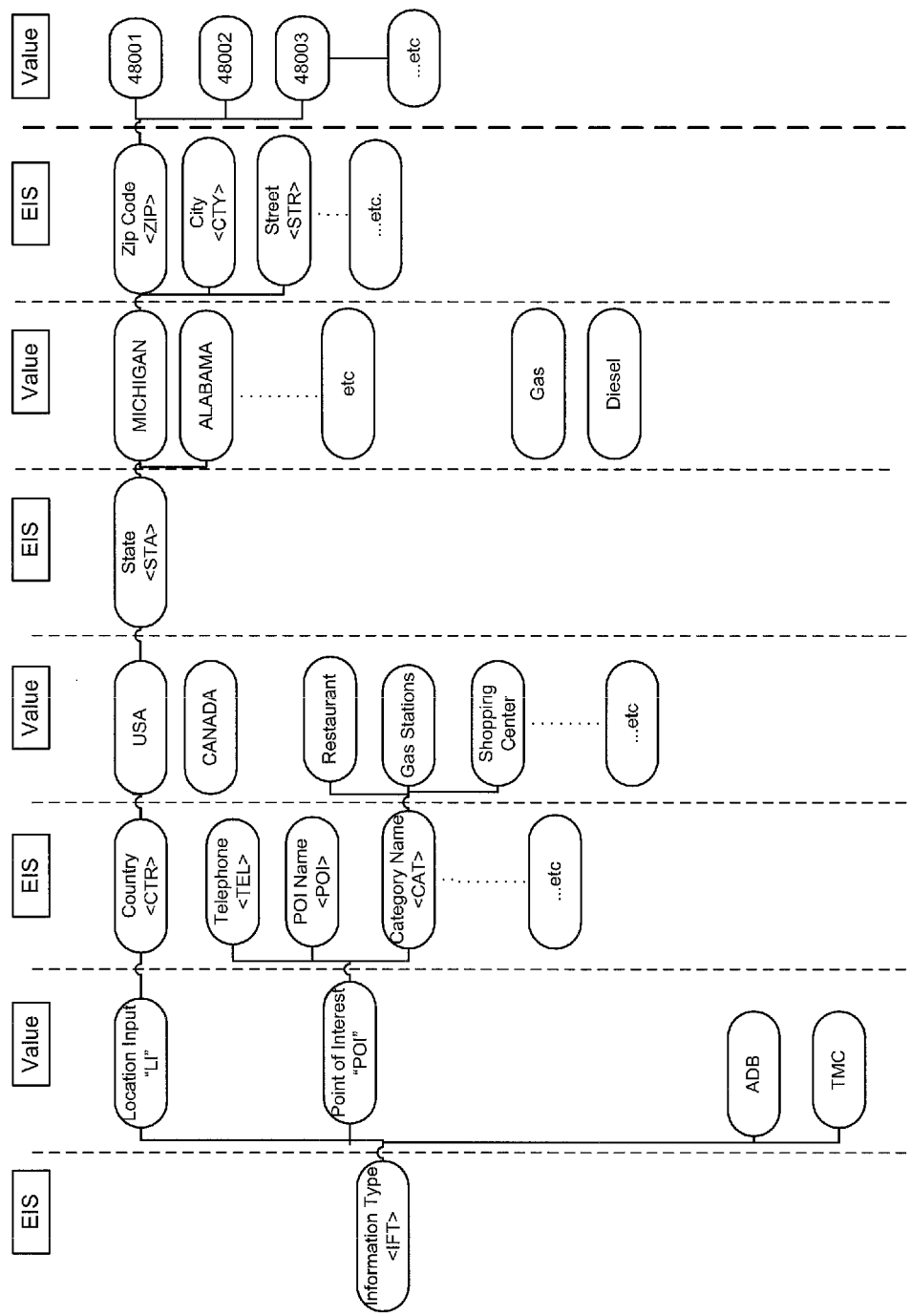
FIG. 6 is an information tree diagram showing one example of an information tree structure suitable for implementing an information discovery and exchange interface component.

As can be seen in FIG. 6, information available from the navigation solution may include a root identifier (Information Type), which may be designated as such in the EIS as <IFT>. In this example, the navigation solution presents four types of information for use by the navigation platform: (1) Location Input; (2) Point of Interest; (3) Map; and (4) TMC information types. These information types each include additional sub-types, represented by the respective branches in the information tree. For example, Location Input type information includes the sub-types: Country, State and Zip Code. Each may be represented by an appropriate EIS in requests made by the navigation client and responses given by the navigation server.

requestGetAvailableInformation (inputEIS)—This function requests a list of next available refinements for the current information. The parameter inputEIS is an encoded information string (EIS) representing the information requested and will include a list of all the available information types at the specified level and count of items available for each type. If a NULL-pointer (empty string) is passed, the top or root level of available information is returned to the client.

responseGetAvailableInformation (inputEIS, availableTypesEIS)—This server response function will provide a list of next available information types in the information tree structure in which information available on the navigation solution is provided, based on the passed information. The parameter input EIS is the same EIS as passed in the request command so that the client side may match the response from the server to the original request issued. The returned parameter availableTypesEIS represents the available information types, each with a total item count as the value. A NULL pointer makes the response invalid.

requestGetDetails (inputEIS, requestedFields)—This function requests detailed information based on the information provided with regard to the inputEIS string. The strings in the requested fields will all be formatted as EIS tokens surrounded by tag indicators < >. For example, <GEO> or <ALL>. The parameter requestedFields represents the requested fields for the navigation server to provide.

responseGetDetails (inputEIS, validState, requestedFields, outputEIS). This is a response function to return the details on information provided in response to the requestGetDetails command. The parameter validState is an enumeration having possible values of valid or invalid to indicate validity of the state, which indicates whether the request was successful. The requestedFields parameter contains the same fields requested in the request command in order to match the request to the response. The outputEIS parameter contains the output EIS with the added fields.

requestGetList (inputEIS, startIndex, resultCount, sortOptions, fieldOptions, cancelState)—This function requests a list of information for the input EIS. The parameter startIndex represents the first element of the list window, count starts at 1. resultCount represents the requested amount of items for the window. Less will be returned, the available count is less than the requested amount. A value of −1 indicates to return all available items. The parameter sortOption represents the method to sort the data; the default sorting string is "Default". The parameter sortOption is an enumeration with possible values of defaultSort (identifies default sorting); ascending (ascending sort); descending (descending sort); nearFirst (nearest first sorting); farFirst (farther first sorting); hierarchicalSort (higher hierarchy first sorting); hierarchicalDescSort (lower hierarchy first sorting). The parameter fieldOptions represents a string array structure with requested fields to return for the current request. The default field string is "Default". The parameter cancelState represents the cancel state. A true value is used to cancel a currently pending request when a previous request was made with the same parameters; the confirmation will be sent as a response with complete flag set to true, a false value will we treated as a separate request. The list of information may also be returned as a file in shared memory instead of entries in the itemList, if the client adds the <VIM>, <PATH> and <LANG> tags immediately after the <IFT> tag in the input EIS.

responseGetList (inputEIS, validState, startIndex, resultCount, sortOptions, fieldOptions, itemList, outputEIS, completeState)—This function provides a list of the requested information. The behavior of this response is flexible to support all of the requested data in one response or partial results with only some of requested results by marking the complete flag with false. Thus, it is possible to receive multiple responses for a single requestGetList call. If the <PATH> specified in the input EIS was for a pre calculated list, the actual <PATH> will be returned in the outputEIS. validState represents the state indicating if the request was successful. startIndex, resultCount, sortOptions and fieldOptions are as explained in the requestGetList command. ItemList is the list of requested items. The parameter outputEIS contains additional information if different than the original request. The parameter completeState indicates whether or not the list is complete.

requestGetListInformation (inputEIS)—This function requests the possible sort and field data types for the current information. When used for voice recognition, the navigation client may also include a <VIM> (voice input mode) tag, immediately following the <IFT> (information type) tag in the EIS to request information about a specific voice input type.

response GetListInformation (inputEIS, validState, sortOptions, fieldOptions, output EIS)—This function provides the possible sort and field data types for the requested information. Provides information if the list is pre-compiled <PCP> or will be generated dynamically by the server. This data will be utilized by the client to decide how to present information to the user. The server is only required to provide this information when the client provides the voice input mode in the request <VIM>. The parameter validState indicates if the request was successful. The parameter sortOptions is StringArray structure representing a vector of available sorting options for the current node. The parameter fieldOptions is a StringArray structure representing a vector of field options. The parameter outputEIS includes the output EIS with the added fields, including the <PCP> tag (if requested with <VIM>). A <LANG> tag should be provided for each available language (if requested with <VIM>).

requestGetSpell (inputEIS)—This function requests the set of available characters for spelling the current information (represented by inputEIS) based on the last selection criteria in the EIS record.

responseGetSpell (inputEIS, validState, nextAvailableCharacters, count, isFullMatch)—This function provides the next available characters and remaining count for the information represented in inputEIS. The parameter validState indicates whether or not the request was successful. The parameter nextAvailableCharacters represents the set of remaining next available characters. The parameter count represents the count of items that match the current input. The parameter isFullMatch indicates if the entered string completely specifies an item.

Figure 7:
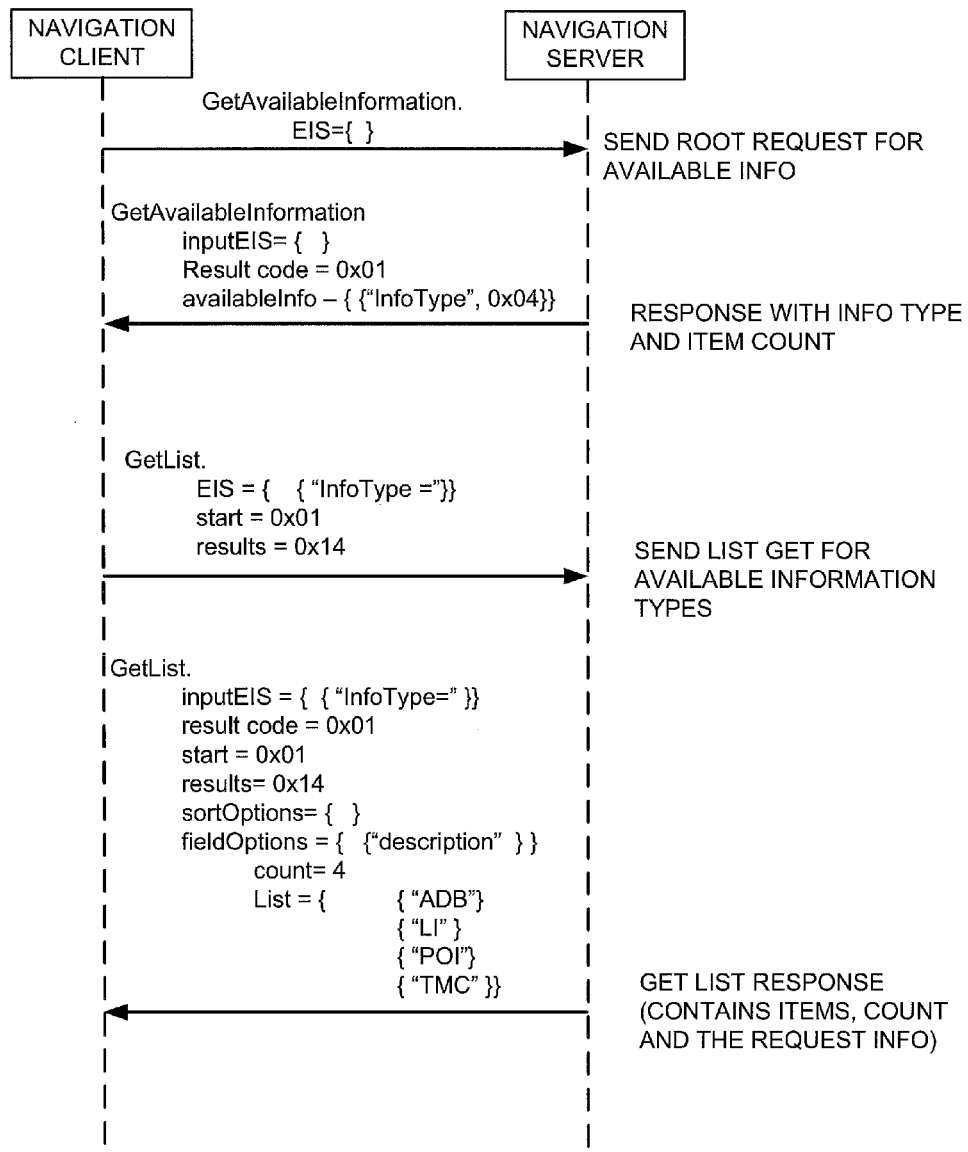
FIG. 7 is a sequence diagram illustrating an example process for information discovery and exchange.

Referring to the sequence diagram illustrated in FIG. 7, the information available from the navigation solution (navigation server in FIG. 7) is first discovered via a request from the navigation platform (navigation client) using the example requestGetAvailableInformation function described above. A null value is given in the command to indicate a root request for available information. The server responds with a responseGetAvailableInformation message that includes the inputEIS value (null in this case and provided back to the client for message control/accounting purposes). A result code indicating one result from the root request, the result being "InfoType" and indicating a value of (4). The navigation client then issues a GetList request to request a list of the four information types associated with the root InfoType. In response, the server provides a responseGetList message that provides a list of the four types of information: LDB; LI; POI; and TMC. Thus, the navigation solution identifies to the navigation platform the types of information available for use.

Figure 8:
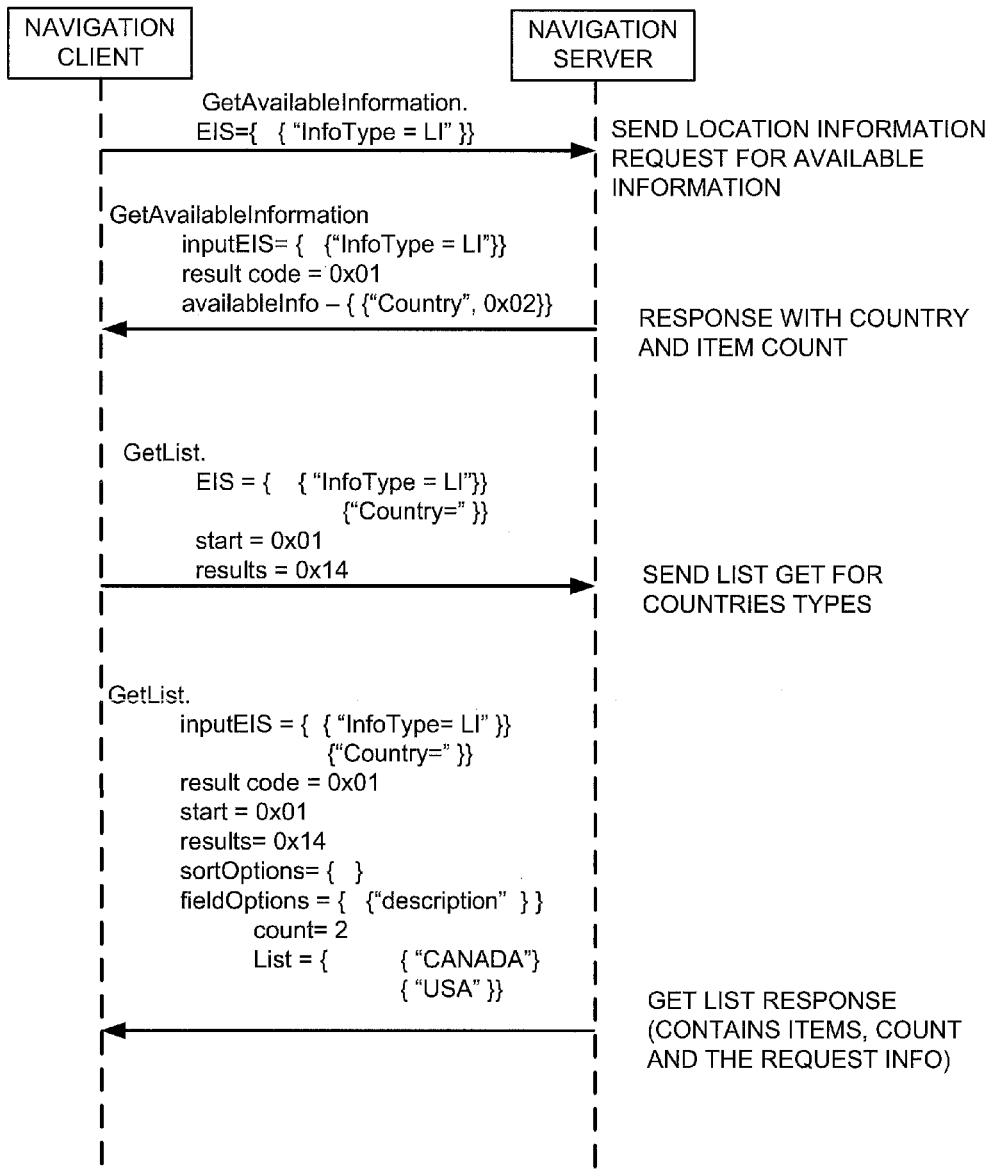
FIG. 8 is a sequence diagram illustrating one example of a process for obtaining country information in an information discovery and exchange interface.

FIG. 8 is a sequence diagram showing further retrieval of location information from the navigation solution. The client issues a GetAvailableInformation request now with an EIS specifying the InfoType as location information (LI). The information returned from the server in the availableInfo field is the "Country" information type identifier and a parameter specifying two further information types. A GetList request is then issued by the client to retrieve the list of two "country" information types. The item count of (2) and the list indicating "CANADA" and "USA" is returned from the server.

Figure 9A:
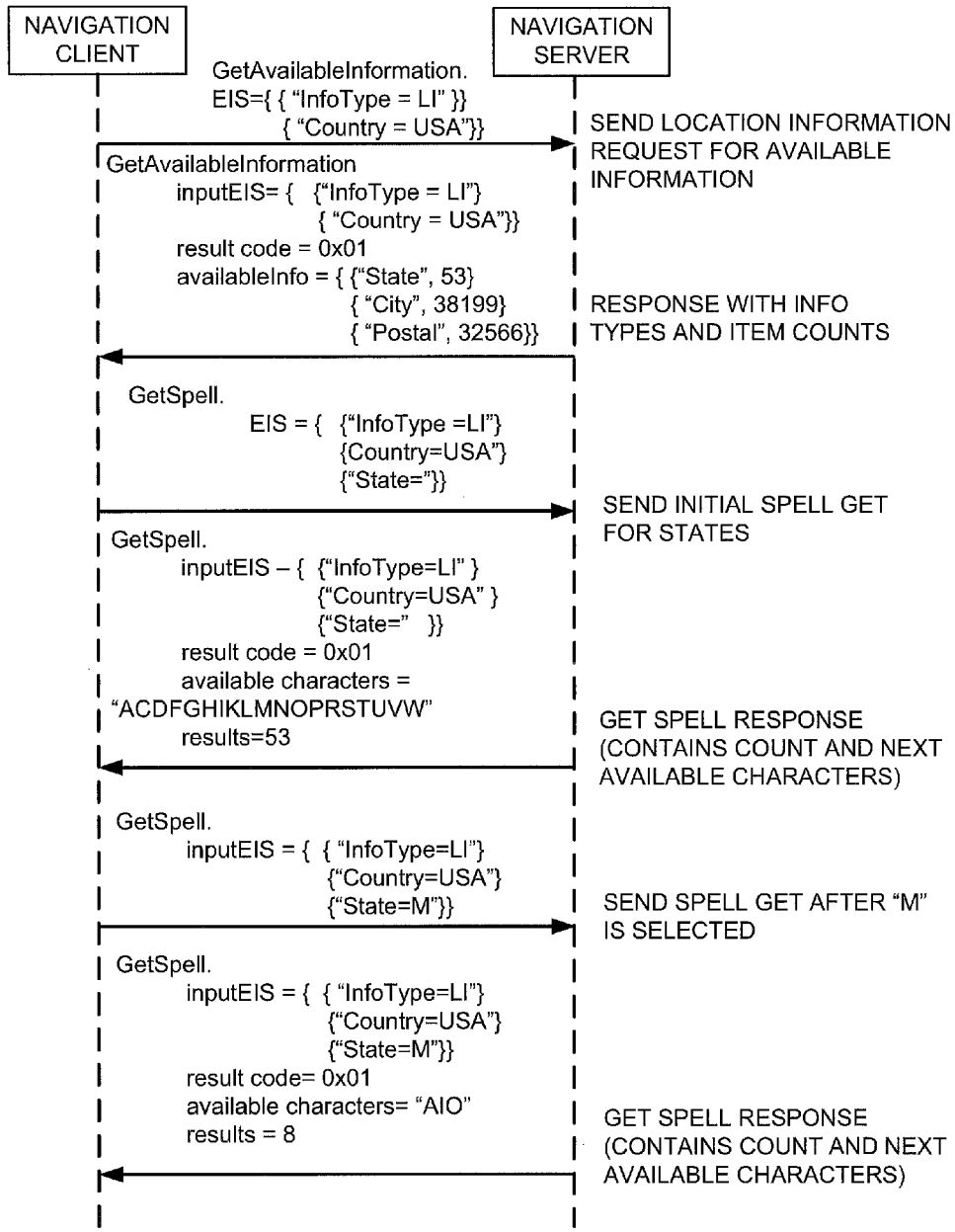
FIGS. 9A and 9B represent a sequence diagram illustrating an example process for obtaining state information in an information exchange interface.
Figure 9B:
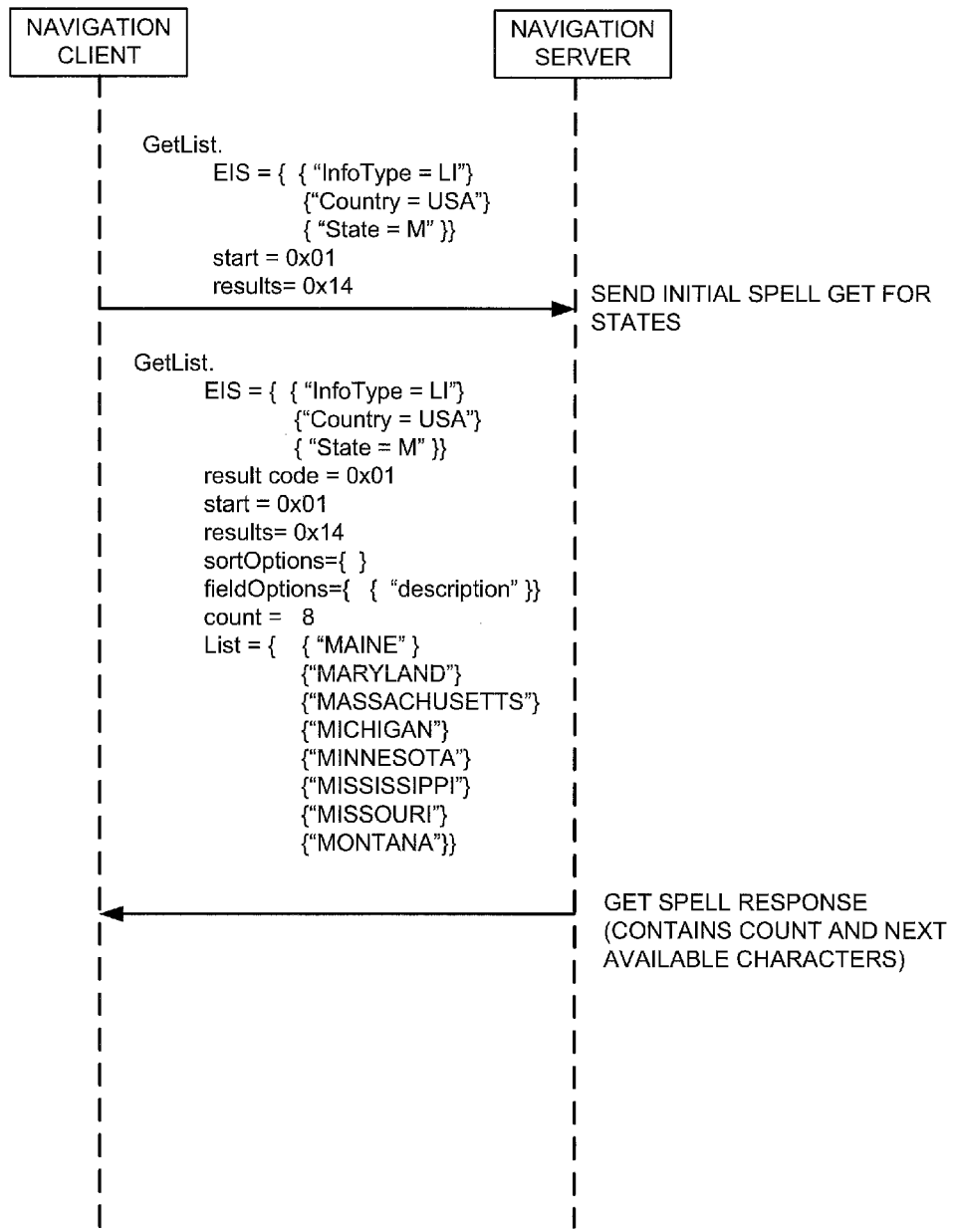

FIGS. 9A and 9B illustrate a similar sequence diagram for retrieval of state location information. The interchange between the client and server proceed in a fashion similar to the country information process described above. However, because of the large number of results returned in the availableInfo field (53 states), the GetSpell function is used twice to focus the retrieval of information from the server. The first GetSpell response returns a list of available characters and number of results meeting the "State=" criteria (53). The second GetSpell request is configured to retrieve the subset of states beginning with the letter "M" and causes a response indicating 8 items and the available characters "AIO". The GetList function is again used to get a list of states meeting the criteria.

As will be apparent, the above-described functions and sequences may be used to implement an information discovery and exchange interface component 414 that may identify all information available from the navigation solution. The scheme for encoding information available from the navigation solution and via the information exchange interface is not limited to the four example information types, but extends to route and intersection information and virtually all types of information made available by the navigation solution.

As a further example, intersection information may be utilized as set forth in the steps and associated request and respond functions described below:

send request to server to get next available type—
　requestGetAvailableInformation
　　("<IFT>LI<*><CTR>United
　　States<*><STA>Michigan<*><CTY>Ann
　　Arbor<*>")
response from server with available info—
　responseGetAvailableInformation
　　("<IFT>LI<*><CTR>United
　　States<*><STA>Michigan<*><CTY>Ann
　　Arbor<*>", "<STR>301<*>")

send request to server to get list of street—
names:requestGetList("<IFT>LI<\*><CTR>United States<\*><STA>Michigan<\*><CTY>Ann Arbor<\*><STR><\*>", 1, 3, defaultSort, "Default", false)

response from server with street list—
responseGetList ("<IFT>LI<\*><CTR>United States<\*><STA>Michigan<\*><CTY>Ann Arbor<\*><STR><\*>", valid, 1, 3, defaultSort, "Default", {"<STR>31s Dr<\*>","<STR>3rd St<\*>","<STR>4th St<\*>"}, false)

send request to server to get next available types—
requestGetAvailableInformation ("<IFT>LI<\*><CTR>United States<\*><STA>Michigan<\*><CTY>Ann Arbor<\*><STR>3rd St<\*>")

response from server available info—
responseGetAvailableInformation ("<IFT>LI<\*><CTR>United States<\*><STA>Michigan<\*><CTY>Ann Arbor<\*><STR>3rd St<\*>", "<HNO>1<\*><ITR>20<\*>")

send request to server to get next speller characters—
requestGetSpell("<IFT>LI<\*><CTR>United States<\*><STA>Michigan<\*><CTY>Ann Arbor<\*><STR>3rd St<\*><ITR><\*>")

response from server with next speller characters—
responseGetSpell ("<IFT>LI<\*><CTR>United States<\*><STA>Michigan<\*><CTY>Ann Arbor<\*><STR>3rd St<\*><ITR><\*>", valid, "CDHJKLMW",20,false)

send request to server to get list of intersection street names—
requestGetList("<IFT>LI<\*><CTR>United States<\*><STA>Michigan<\*><CTY>Ann Arbor<\*><STR>3rd St<\*><ITR>C<\*>", 1, 3, defaultSort, "Default", false)

response from server with intersection list—responseGetList ("<IFT>LI<\*><CTR>United States<\*><STA>Michigan<\*><CTY>Ann Arbor<\*><STR>3rd St<\*><ITR>C<\*>", valid, 1, 3, defaultSort, "Default", {"<STR>Chapin St<\*>"}, false)

As a further example, using the information discovery and exchange interface component 414, a navigation platform may request the entire route list for all segments in a route. Such a request is may be designated by specifying by referencing route element <RTE> with a value of zero. This illustrates how route information may be obtained from the navigation solution using the functions defining the information discovery and exchange interface component 414.

send request to server to get the count of all route segments:
requestGetAvailableInformation ("<IFT>RT<\*><RTH>888<\*><RTE>0<\*>")

response from server available info:
responseGetAvailableInformation( "<IFT>RT<\*><RTH>888<\*><RTE>0<\*>", "<RSG>13<\*>")

send request to server to get list of the route options for route handle 888:
requestGetList ("<IFT>RT<\*><RTH>888<\*><RTE>0<\*> <RSG><\*>", 1, 13, defaultSort, "Default", false)

response from server with route options:
responseGetList ("<IFT>RT<\*><RTH>888<\*><RTE>0<\*> <RSG><\*>", valid, 1, 1, defaultSort, "Default", {"<RTE>1<\*><RSG>0<\*><MNT>6<\*> <MNN>192<\*> <STR>Unnamed road<\*><MND>670<\*><GEO>-83.431103 42.496809<\*><TRT>14000<\*>",
"<RTE>1<\*><RSG>2<\*><MNT>13<\*><MNN>192 <\*><STR>W 12 Mile Rd<\*><MND>3190<\*><GEO>-83.430575 42.497113<\*><TRT>20000<\*>",
. . .
"<RTE>1<\*><RSG>3<\*><MNT>3<\*><MNN>0<\*> <STR>W 12 Mile Rd<\*><MND>16840<\*><GEO>-83.427043 42.497289<\*><TRT>118000<\*>",
"<RTE>2<\*><RSG>4<\*><MNT>13<\*><MNN> 242<\*> <STR>Â» %s EB Detroit<\*><ICON>/tmp/ nng_rs_icon_0.bmp<\*><TXT>M-5<\*><MND>13550<\*><GEO>-83.447696 42.496640<\*><TRT>92000<\*>",
. . .
"<RTE>2<\*><RSG>15<\*><MNT>3<\*> <MNN>0<\*> <STR>1660 Brookdale Dr<\*><MND>0<\*><GEO>-83.430684 42.296395<\*><TRT>0<\*>"}, false)

As will be recognized, each list item for the full route list should contain the <RTE> to which it belongs.

It will also be apparent to those of ordinary skill, that this aspect of identifying information available from the navigation solution accommodates the addition of new types of information to be provided by the navigation solution, and discovery of such by the navigation platform. That is, new functionality and information made available on a next-generation navigation solution may be utilized by an existing navigation platform without upgrading the navigation platform. For example, the addition of a lane recommendation feature on the navigation solution, and the associated information available may be identified to the navigation platform by the addition of a new Information Type designated "Lane Recommendation" with a new set of EIS tokens and a corresponding additional branch (not shown) on the information tree depicted in FIG. 6.

Vehicle Position Information Interface Component requestVehicleLocationInformationDetails (updateMode, updateInterval)—This function enables or disables position information updates based on the specified time interval. The updateMode parameter indicates how updates of the orientation should be sent and is an enumeration with possible values of: disable (disable updates); once (update once); onChange (update on change in orientation); and frequency (defined frequency for updates). The updateInterval parameter represents the maximum rate at which position updates will be supplied to the client. Updates will typically only be supplied on change. Value is in ms.

inform VehicleLocationInformationDetails (posInfo)— This function provides the details of the current location specified by posInfo. This includes geo position, heading, and all available country, state, city, current street info, closest cross-streets, etc. It may also include speed limits, time zone, lane recommendation.

Navigation Route Interface Component requestBlockRoute (operation, items)—This function adds or removes item(s) from Route(s) calculation and may be used to specify vectors or other items representing routes or segments to avoid globally and/or locally per route. If an empty list of route handles is supplied, the blocked items will be applied globally and affect all new route calculation and the currently active route. Only one distance block per route at a time is supported by this function. If a second block is specified, it will replace the previous distance block. The operation parameter signifies segments that should be added or removed from consideration during the route calculation and is an enumeration that may have the value AddBlock, which will remove segments from consideration, or the value RemoveBlock, which will cause the segments to be removed from the blocked list and therefore reconsidered. The parameter items is a list of EIS representing items to omit from a route calculation and could include road segments, route maneuvers or a distance ahead on the route.

responseBlockRoute (operation, items, validState)—This is a server response to requestBlockRoute. The operation and items parameters are as described above. The parameter validstate indicates whether or not the request was successful.

requestNewTrip (destinations, routeModes)—This function creates a new trip. There will be a new route handle—a unique identifier identifying a calculated route defined by a specific route mode—created for each set of route options specified. The parameter destinations is a list of elements representing route elements to be used in the route calculation. The parameter routeModes is a list of elements representing route modes. Route elements will be created for each route mode passed.

responseNewTrip (destinations, routeModes, validState, handles)—This function returns a route handle identifier for each set of route options specified. The parameter handles is a list of route handles. The order of route handles in the list matches the order of specified route options. A route handle value of zero identifies a route with route options at position zero.

requestKillTrip (handles)—Destroys a list of route handles. Turn list and route details will no longer be available in the information tree associated with the route. Destroying the active route handle will cancel guidance. In this case, the function informActiveRouteDescription, explained below, will be updated accordingly.

responseKillTrip (handles)—This function is a server response for route handles that have been destroyed.

requestStartGuidance (routeHandle)—This function starts the route associated with the specified route handle represented by routeHandle. The function informActiveRouteDescription, will be updated automatically.

requestStopGuidance ( )—Stops all routing. ActiveRouteDescription will be updated automatically. When guidance is stopped, the route handle in ActiveRouteDescription will be −1.

informActiveRouteDescription (routeDesc)—Identifies the active route element, also known as the destination, and the active route segment, also known as the maneuver. A route handle of −1 indicates that no route is active. The parameter routeDesc represents the current active route description information.

informNextManeuverinfo(timeDist, nextManInfo)—Provides the remaining time and distance to the next maneuver. This function is only valid when the ActiveRouteDescription contains a valid route handle.

informNextDestinationInfoFunction (nextDestInfo)—Provides the remaining time and distance to the next destination. Only valid when the ActiveRouteDescription contains a valid route handle. The parameter nextDestInfo represents information about the next destination.

inform CalculationState (routeHandle, calcState, calcPercent)—This function returns information for a changed route calculation state. This response is sent to notify the client when a route has been planned, calculated, re-calculated, or a destination has been reached. This is the trigger to get route segment list (turn list). The parameter routeHandle represents the changed route handle, calcState represents the new calculation state (idle, planning, planned, calculating, calculated, routing, routed or failed) and calcPercent represents the total percentage of the route that has been calculated (0 to 100 or −1 if not available).

The above functions may provide an expedient way for the navigation platform to affect the routing functions provided by the navigation solution. For example, to issue a command to the navigation solution to block a particular route a specified distance ahead, the requestBlockRoute and responseBlockRoute functions may be utilized. For example, to block the route 5000 meters ahead, the client would send the following command:

requestBlockRoute(AddBlock,
{"<IFT>RT<*><RTH>888<*><RRD>5000<*>"})
and the server would respond with the following command:
responseBlockRoute(AddBlock,
{"<IFT>RT<*><RTH>888<*><RRD>5000<*>"}),
valid).

As will be recognized, the navigation route interface component functions may be used to achieve various route blocking functionality, such as removing a block ahead, blocking an entire route segment, blocking only the maneuver of a route segment. Moreover, the GetAvailableInformation function of the information exchange interface component may be utilized with route information, which is stored in an information tree structure similar to that shown in FIG. 6, for example, to retrieve a list of route blocks for a particular route handle:

send request to server to get next available types:
requestGetAvailableInformation
("<IFT>RT<*><RTH>888<*>")
response from server available info: responseGetAvailableInformation( "<IFT>RT<*><RTH>888<*>", "<RTO>1<*><RTE>1<*><BLK>2<*>")

The Blocked Segments <BLK>, will contain all types of blocked items for the route including Blocked Segment Maneuvers and Blocked Road Distance.

send request to server to get list of the blocked segments for route handle 888:
requestGetList
("<IFT>RT<*><RTH>888<*><BLK><*>", 1, 3, defaultSort, "Default", false)
response from server with blocked segments:
responseGetList
("<IFT>RT<*><RTH>888<*><BLK><*>", valid, 1, 3, defaultSort, "Default",
{"<IFT>RT<*><RTH>888<*><BLK>1<*>
<STR>From Street—To Street<*><BET>1<*><GEO>−83.22 42.53<*>",
"<IFT>RT<*><RTH>888<*><BLK>2<*>
<STR>From Street—To Street<*><BET>2<*><GEO>−83.42 42.23<*>",
"<IFT>RT<*><RTH>888<*><BLK>3<*>
<MNT>25<*><S
TR>Street<*><BET>3<*><GEO>−83.12 42.73<*>"}, false)

The following example illustrates a route options tree expansion that may be implemented with the above functions:
send request to server to get next available types:
requestGetAvailableInformation
("<IFT>RT<*><RTH>888<*>")
response from server available info:
responseGetAvailableInformation
("<IFT>RT<*><RTH>888<*>",
"<RTO>1<*><RTE>1<*><BLK>1<*>")
send request to server to get list of the route options for route handle 888:
requestGetList
("<IFT>RT<*><RTH>888<*><RTO><*>", 1, 1, defaultSort, "Default", false)
response from server with route options:
responseGetList
("<IFT>RT<*><RTH>888<*><RTO><*>", valid, 1, 1, defaultSort, "Default",
{"<RTO>9<*><URO>8<*><RAT>136<*>
<RCS>4<*><RRD>24532
0<*><TRT>3756324<*>"}, false)

The returned EIS above indicates the following: Requested route options, <RTO>fastest avoidMotorways<*>; Unfulfilled Route Options, <URO>avoidMotorways<*>; Avoidance types on route, <RAT>avoidMotorways|avoidUnpaved<*>; Route Calculation state, <RCS>Calculated<*>; Real Road Distance (decimeters), <RRD>245320<*>; Remaining Travel Time (ms), <TRT>3756324<*>

Navigation Audio Interface Component

The navigation audio interface component includes functions for enabling the navigation client component to utilize audio services provided by the navigation server component.

informPromptReady (audioSource)—This function is provided on the navigation server and indicates to the client that a prompt is ready. The parameter audioSource may be an enumeration having possible values of: audioIdle: the default navigation audio source (indicates no navigation audio is currently playing). audioAutomatic: the navigation core initiated audio source, for example, a turn recommendation triggered by the vehicle's approach to a maneuver location; audioManual: user initiated audio source, for example, if the user requests repeat of a navigation prompt.

requestPromptReady (audioSource)—This client function indicates to the navigation server that the prompt may be played on the specified audio source.

requestSetADA (adaState)—This function enables or disables acoustic driving announcements (ADA). The parameter adaState is a binary state indicator. Subsequent calls with the same binary state are to be ignored.

informADAIsEnabled (isEnabled)—This function indicates ADA is enabled or disabled. If IsEnabled is TRUE, navigation audio announcements will be played. If IsEnabled is FALSE, navigation audio announcements will not be played.

requestCancelADA( )—This is a function to cancel the current acoustic driving announcements (ADA). This function call only affects a currently outputted ADA and has no effect on subsequent ones.

requestRepeatADA( )—This is a function to repeat the last ADA. The last ADA is to be repeated. If no ADA has been outputted so far, the call is to be ignored.

informActiveAudioSource (audioSource)—This function will return the currently playing audio source. The states represented by audioSource may be: idle, auto or manual. The parameter audioSource represents the currently playing audio source.

Figure 10:
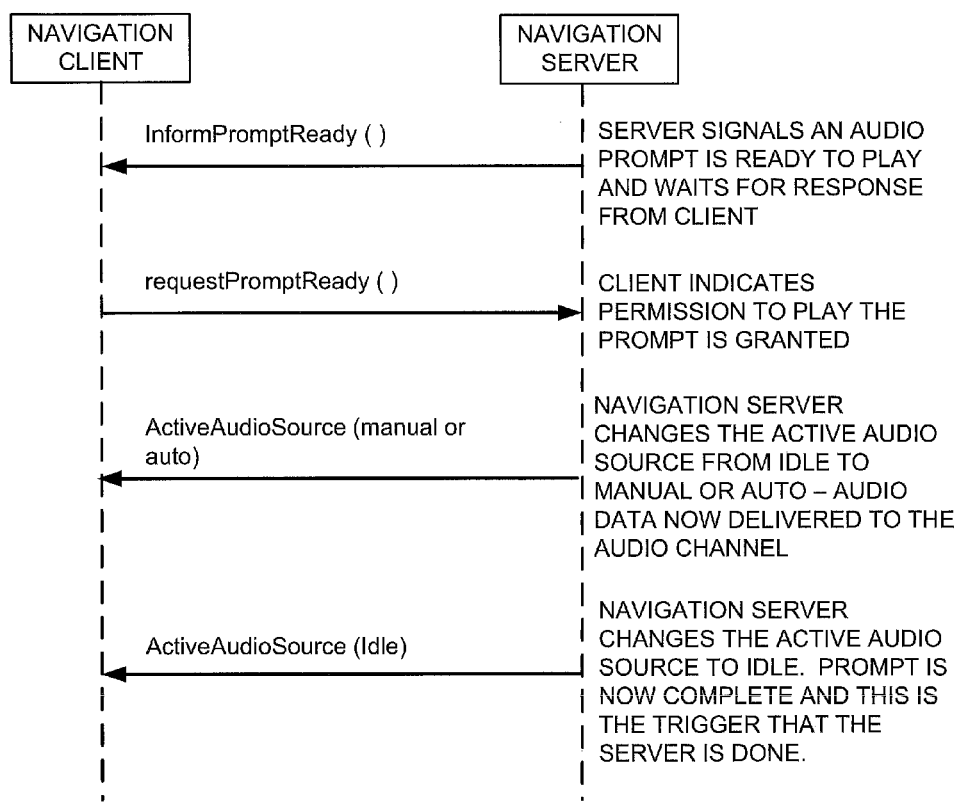
FIG. 10 is a sequence diagram showing an example process performed by a navigation audio interface component.

An example sequence utilizing the above functions will now be explained with reference to FIG. 10. The navigation client may initiate a requestPromptReady function before the corresponding audio will be played. Thus, the first step in the sequence is for the navigation server to issue an informPromptReady message to signal that an audio prompt is ready to play. This is followed by the acknowledgement from the HMI (and navigation client component) in the form of the requestPromptReady command, indicating permission for the navigation solution to begin audio delivery. Then the navigation server responds with informActiveAudio source changes the active audio source from idle to manual. When the client receives the informPromptReady message, it will set the audio attribute to the current audio source and begin playing audio. When it is finished, it will set the AudioPrompt attribute to idle. The HMI may use this trigger to change the audio source.

Traffic Message Channel Interface Component

The traffic message channel interface component includes a group of functions for enabling the navigation platform to utilize TMC-related functionality provided by the navigation solution.

requestSetTMCMode (tmcMode)—This function enables and disables the server in processing TMC information. When TMC is disabled, the messages may be removed from displayed maps and TMC message lists are cleared.

informTMCMode (tmcState)—Notifies the client that new TMC information has been received. This information is a trigger to request monitored TMC information. The server will send the signal once after initialization and on change. The parameter tmcState is a binary indicator for indicating that TMC processing is to be switched on or off.

requestSetTMCRouteMode (tmcRouteMode, minutes)—This function sets the acceptance mode of the alternative route when the server provides a new route because of TMC events. The parameter tmcRouteMode may be an enumeration having values of: tmcOff (signifies TMC messages will not be considered during route calculation); tmcAutomatic (signifies TMC messages will be considered during route calculation, and the server will accept the calculated route automatically); tmcManual (signifies the tmc messages will be considered during route calculation, but the server will not accept the calculated route automatically); or tmcDelay (signifies that the server will only change the current route if the specified delay time is exceeded by the current route). The parameter minutes represents a minimum remaining time difference. The server will provide a new route only if the new route is faster than the current route by the given time difference. If the difference is less than the given time, the calculated route will be dropped.

informTMCRouteMode (tmcRouteMode, minutes)—This function notifies the client of the current TMC route mode. The server will send the signal once after initialization and on change.

informTMCInfoChanged (tmcInfo)—This function notifies the client that new TMC information has been received. This information is a trigger to request monitored TMC information.

inform TMCOnRouteChanged—Notifies the client that new TMC information on the specified route handles has been received. This information is a trigger to request monitored TMC information.

inform TMCRoutesAvailable (routeList, tmcNewEvents, tmcDeletedEvents)—This function notifies the client of the alternative routes available based on received TMC information when the acceptance mode is tmcManual. The parameter routeList represents a list of route handles with updated TMC information. The parameter tmcNewEvents represents a list of the most significant new tmc events that caused calculation of the alternative routes. The parameter tmcDeletedEvents represents a list of the most significant deleted tmc events that caused the calculation of the alternative routes. This information is a trigger to request monitored TMC information.

requestTMCIgnore—This is a function to specify events or groups of TMC events to ignore or stop ignoring. Ignored TMC messages and groups will be removed from consideration for route calculation. Ignored TMC messages will be available in the information interface at <IFT>TMC<*><RQT>IgnoredMessages<*>. Ignored TMC messages groups will be available in the information interface at <IFT>TMC<*><RQT>IgnoredMessageGroups<inform. TMCIgnoresChanged will be called by the server after the TMCIgnore Function has been completed. This will notify the client that the ignores have been updated.

informTMCIgnoresChanged—Function to notify the client that ignored TMC information has been changed. This information is a trigger to request monitored TMC information.

requestTMCAvoid—Specifies events or groups of TMC events to avoid or stop avoiding. Avoided TMC messages and groups shall have an additional penalty placed on them for route calculation purposes. Avoided TMC messages will be available in the information interface at: <IFT>TMC<*><RQT>AvoidedMessages<*>. Avoided TMC messages groups will be available in the information interface at<IFT>TMC<*><RQT>AvoidedMessageGroups<*>. The function inform TMCAvoidsChanged will be called by the server after the tmc avoid function has been completed. This will notify the client the avoids have been updated.

informTMCAvoidsChanged—This notifies the client that avoid TMC information has been changed. This information is a trigger to request monitored TMC information.

Those of ordinary skill will recognize that the above-described implementations illustrate the invention. The API provides an abstraction layer for the underlying complexity in a navigation solution. For example, instead of requiring the navigation platform to issue a significant number of complex programming level commands to the navigation solution to draw out a complex route overview with alternative routes, the navigation platform may issue relatively fewer commands, such as the high level example functions disclosed above, relating to higher level steps since the navigation solution is configured according to the pre-defined, standard set of functions defining the example API. Moreover, the API enables flexible and efficient integration of navigation solutions into navigation platforms, rapid prototyping of navigation solutions independent of the development of a host navigation platform, as well as the discovery of information types and functionality available from any navigation solution.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A navigation system comprising:
a processor;
a navigation platform including a plurality of support devices;
an application interface configured to interface the navigation platform with a navigation solution, the interface including a set of pre-defined functions executable by the processor to adapt the navigation platform according to a plurality of information types included in an information tree provided by the navigation solution, wherein the navigation solution contains information corresponding to each information type;
an information discovery and exchange component executable by the processor to discover the information types available in a specified level of the information tree provided by the navigation solution by:
issuing a request for information types corresponding to a specified level of the information tree, wherein each information type is associated with a different set of information values included in the information tree; and
in response to the request for information types, receiving a list of identifiers representing the information types at the specified level, where each identifier corresponds to a different information type; and
the navigation platform configured to determine, using the processor, a subset of the pre-defined functions supported by the navigation solution based on the discovered information types, and where the navigation platform is further configured to access the information values in the information tree of the navigation solution by issuance of a request for information using the subset of the pre-defined functions.

2. The navigation system of claim 1, where the application interface includes a rapid prototyping interface component to enable functional evaluation of the navigation solution independent from the navigation platform.

3. The navigation system of claim 1, where the predefined functions include a function to configure a visual output of the navigation solution by positioning the visual output of the navigation solution on a display device on the navigation platform.

4. The navigation system of claim 1, where the predefined functions are configured to make requests of and receive responses from the navigation solution to thereby implement a client-server architecture.

5. The navigation system of claim 1, where the plurality of support devices include at least one of a tactile input device, a speech input device, an audio output device, a display device, a communications unit, and a plurality of sensors.

6. The navigation system of claim 1, further comprising an inter-process communication interface executable by the processor, configured to manage inter-process communication between the navigation platform and navigation solution.

7. The navigation system of claim 1, further comprising a navigation route interface component, executable by the processor, configured to make requests of and receive responses from the navigation solution to identify a route from a first location to a second location based on the information available from the navigation solution.

8. The navigation system of claim 7, where the navigation route interface component is further configured to add or remove a block of one or more segments from the identified route.

9. The navigation system of claim 7, where the identified route is an optimized route based on a combination of one or more factors of remaining travel time, real road distance, avoiding motorways, avoiding unpaved roads.

10. The navigation system of claim 1, where the request for information comprises an identifier corresponding to the information type associated with the information values being accessed by the navigation platform.

11. The navigation system of claim 1, where
the information discovery and exchange component is further configured to reissue the request for information types in response to an indication from the navigation solution that the navigation solution is upgraded with an additional information type and corresponding additional information; and
the navigation platform further configured to modify the request for information by adding an additional identifier to the request for information, the additional identifier corresponding to an additional information type.

12. A navigation platform comprising:
a memory; and
a processor coupled to the memory and configured to:
discover a plurality of information types included in a root level of an information tree available from a navigation solution by:
issuing a first request to the navigation solution, the first request comprising a token corresponding to the information types, wherein each information type is associated with a different set of information values included in the information tree; and
in response to the first request, receiving from the navigation solution a plurality of information type identifiers representing the information types at the root level of the information tree, where each of the information type identifiers identifies a different information type;
discover one or more information refinements corresponding to an information type available from the navigation solution by issuing a second request to the navigation solution, the second request comprising an information type identifier of the information type and, in response, receive from the navigation solution a list of refinement identifiers representing all information refinements at a second level of the information tree, where a refinement identifier identifies a respective refinement of the information type;
generate and issue a third request to the navigation solution, the third request comprising the information type identifier and one or more of the corresponding refinement identifiers and, in response, receive from the navigation solution information values corresponding to the second level of the information tree and corresponding to the information type identifier and the one or more corresponding refinement identifiers; and
generate navigation functionality in response to transmission of the generated requests, the navigation functionality for display with other than the navigation solution based on the information values received from the navigation solution.

13. The navigation platform of claim 12 further comprising a user interface configured to receive and display the generated navigation functionality.

14. The navigation platform of claim 12, where the third request further comprises an option to sort the information values received from the navigation solution, and in response, receive from the navigation solution the information values corresponding to the information type identifier and the one or more corresponding refinement identifiers, where the received information is sorted according to the option to sort.

15. A method of integrating a navigation solution into a navigation platform using an application programming interface, the method comprising:
transmitting a first message to the navigation solution, by the navigation platform, the first message comprising a request for types of information corresponding to a specified level of an information tree of the information tree and available from the navigation solution, wherein each type of information is associated with a different set of information values included in the information tree;
in response to the request for types of information, receiving a first response, from the navigation solution, at the navigation platform, the first response comprising a first list of identifiers representing the information types at a root level of the information tree, where each identifier in the first list of identifiers corresponds to a different type of information available from the navigation solution;
transmitting to the navigation solution, by the navigation platform, a second message for each respective type of information, the second message comprising an identifier of a type of information and a request for sub-types of information available for the type of information;
in response to the request for sub-types of information, receiving a second response from the navigation solution, at the navigation platform, the second response comprising a second list of identifiers representing information refinements at a second level of the information tree, where each identifier in the second list of identifiers corresponds to the sub-type of information available for the type of information corresponding to the identifier in the second message;
discovering, by the navigation platform, a structure of information values available from the navigation solution corresponding to the second level of the information tree and based on the receipt of the first response and the second response, where the structure of the information values available from the navigation solution comprises classification of the information values in a plurality of sub-types of the types of information;
configuring the navigation platform to provide navigation functionality of the navigation solution using the navigation platform according to the structure of the information values available from the navigation solution;
receiving, at the navigation platform, a request for navigation; and
providing, at the navigation platform, the navigation based on the information values accessed from the navigation solution.

16. The method of claim 15, further comprising:
generating, at the navigation platform, in response to receiving the request for navigation, a string of identifiers corresponding to navigation information to provide the requested navigation, where the string of identifiers comprises identifiers from the first list of identifiers and the second list of identifiers;
transmitting to the navigation solution, by the navigation platform, a third message for the navigation information, the third message comprising the string of identifiers;

receiving a third response from the navigation solution, at the navigation platform, in response to the third message, the third response comprising the navigation information.

17. The method of claim 15, where the application programming interface includes a rapid prototyping interface component executable at the navigation platform and the method further comprising evaluating the navigation solution, at the navigation platform, using the rapid prototyping interface component, and where the rapid prototyping interface component comprises at least one of initialization, scrolling, rotation and route guidance functionality of the navigation platform.

18. The method of claim 15, where the navigation platform communicates with the navigation solution using encoded information strings.

19. The method of claim 15, where the navigation solution is in communication with the navigation platform, where the communication comprises a wireless communication medium.

20. The method of claim 15, where the navigation includes providing information about a route from a specified source location to a specified destination location, the route information including a list of all segments in the route.

* * * * *